(12) United States Patent
Ding et al.

(10) Patent No.: US 12,474,942 B2
(45) Date of Patent: Nov. 18, 2025

(54) SCALING CLUSTER WITHOUT RE-IMAGING NODES

(71) Applicant: Dell Products L.P., Round Rock, TX (US)

(72) Inventors: Edward Guohua Ding, Shanghai (CN); Jim Lewei Ji, Shanghai (CN); Tianming Zhang, Brighton, MA (US)

(73) Assignee: Dell Products L.P., Round Rock, TX (US)

( * ) Notice: Subject to any disclaimer, the term of this patent is extended or adjusted under 35 U.S.C. 154(b) by 446 days.

(21) Appl. No.: 17/559,272

(22) Filed: Dec. 22, 2021

(65) Prior Publication Data
US 2023/0195486 A1    Jun. 22, 2023

(51) Int. Cl.
*G06F 9/455*    (2018.01)
*G06F 9/50*    (2006.01)

(52) U.S. Cl.
CPC ........ *G06F 9/45558* (2013.01); *G06F 9/5072* (2013.01); *G06F 2009/45562* (2013.01); *G06F 2009/4557* (2013.01)

(58) Field of Classification Search
CPC ............... G06F 9/45558; G06F 9/5072; G06F 2009/45562; G06F 2009/4557; G06F 11/1469; G06F 11/1425; G06F 8/60
See application file for complete search history.

(56) References Cited

U.S. PATENT DOCUMENTS

| | | | |
|---|---|---|---|
| 9,118,538 B1* | 8/2015 | Lekkalapudi | H04L 67/025 |
| 2004/0205148 A1* | 10/2004 | Bae | G06F 11/1425 709/213 |
| 2011/0173428 A1* | 7/2011 | Goettel | H02H 7/0855 713/2 |
| 2014/0096121 A1* | 4/2014 | Joshi | H04L 41/0893 717/170 |
| 2020/0151024 A1* | 5/2020 | Ji | G06F 9/546 |
| 2020/0169558 A1* | 5/2020 | Gordon | G06F 21/629 |
| 2020/0394282 A1* | 12/2020 | Wang | G06F 21/105 |
| 2022/0210016 A1* | 6/2022 | McBride | H04L 41/0806 |

OTHER PUBLICATIONS

Chu Jay Tan, Junita Mohamad-Saleh, Khairu Anuar Mohamed Zain, and Zulfiqar Ali Abd. Aziz. 2017. Review on Firmware. In Proceedings of the International Conference on Imaging, Signal Processing and Communication (ICISPC 2017). Association for Computing Machinery, New York, NY, USA, 186-190. (Year: 2017).*

* cited by examiner

*Primary Examiner* — Jorge A Chu Joy-Davila
(74) *Attorney, Agent, or Firm* — Jackson Walker L.L.P.

(57) ABSTRACT

An information handling system may include at least one processor and a memory. The information handling system may be configured to: add a node to a cluster of information handling systems; while the node is a member of the cluster, cause a plurality of components of the node to be changed according to a first set of changes; for each change in the first set of changes, store a record of the change; and in response to an indication that the node is to be removed from the cluster, cause the plurality of components of the node to be changed according to a second set of changes, wherein the changes in the second set of changes are configured to undo the changes in the first set of changes.

15 Claims, 7 Drawing Sheets

SCALING CLUSTER WITHOUT RE-IMAGING NODES

TECHNICAL FIELD

The present disclosure relates in general to information handling systems, and more particularly to the management of clusters of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), it is desirable to be able to scale a cluster of information handling systems (e.g., a cluster of physical servers or nodes) by expanding and/or shrinking the cluster easily and flexibly as workloads change. In some situations, however, the expansion procedure might fail at some intermediate step, leaving the new physical server in a state referred to as "configured unhealthy" in which the server is not usable. Another situation in which difficulties may arise is that of a node which is added successfully, but then later removed from a cluster.

In situations like this, a recovery procedure may be triggered either to re-image the entire physical server to a state referred to as "unconfigured good," or to reset the server to a factory default state. These procedures are generally time- and resource-intensive, however.

One reason for the re-imaging/resetting to factory defaults is that there are firmware and software elements that are pre-installed during manufacture, and when the server is involved in a cluster expansion, the status of these pre-installed elements is often modified by the HCI management system (e.g., to conform to the versions of such components in the existing cluster). Accordingly, if the procedure fails after being partially completed, the server may become "configured unhealthy" and then cannot be added to any HCI cluster at all.

Another situation that may arise is that a customer may adjust the number of physical servers between various clusters (e.g., by removing a server from one cluster and adding it to a different cluster). This may involve removing a "configured good" server from one cluster and adding it into another. This may also involve re-imaging or resetting the removed server to factory defaults as well.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with management of clusters of information handling systems may be reduced or eliminated.

In accordance with embodiments of the present disclosure, an information handling system may include at least one processor and a memory. The information handling system may be configured to: add a node to a cluster of information handling systems; while the node is a member of the cluster, cause a plurality of components of the node to be changed according to a first set of changes; for each change in the first set of changes, store a record of the change; and in response to an indication that the node is to be removed from the cluster, cause the plurality of components of the node to be changed according to a second set of changes, wherein the changes in the second set of changes are configured to undo the changes in the first set of changes.

In accordance with these and other embodiments of the present disclosure, a method may include adding a node to a cluster of information handling systems; while the node is a member of the cluster, causing a plurality of components of the node to be changed according to a first set of changes; for each change in the first set of changes, storing a record of the change; and in response to an indication that the node is to be removed from the cluster, causing the plurality of components of the node to be changed according to a second set of changes, wherein the changes in the second set of changes are configured to undo the changes in the first set of changes.

In accordance with these and other embodiments of the present disclosure, an article of manufacture may include a non-transitory, computer-readable medium having computer-executable instructions thereon that are executable by a processor of an information handling system for: adding a node to a cluster of information handling systems; while the node is a member of the cluster, causing a plurality of components of the node to be changed according to a first set of changes; for each change in the first set of changes, storing a record of the change; and in response to an indication that the node is to be removed from the cluster, causing the plurality of components of the node to be changed according to a second set of changes, wherein the changes in the second set of changes are configured to undo the changes in the first set of changes.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 12, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

Figure 1:
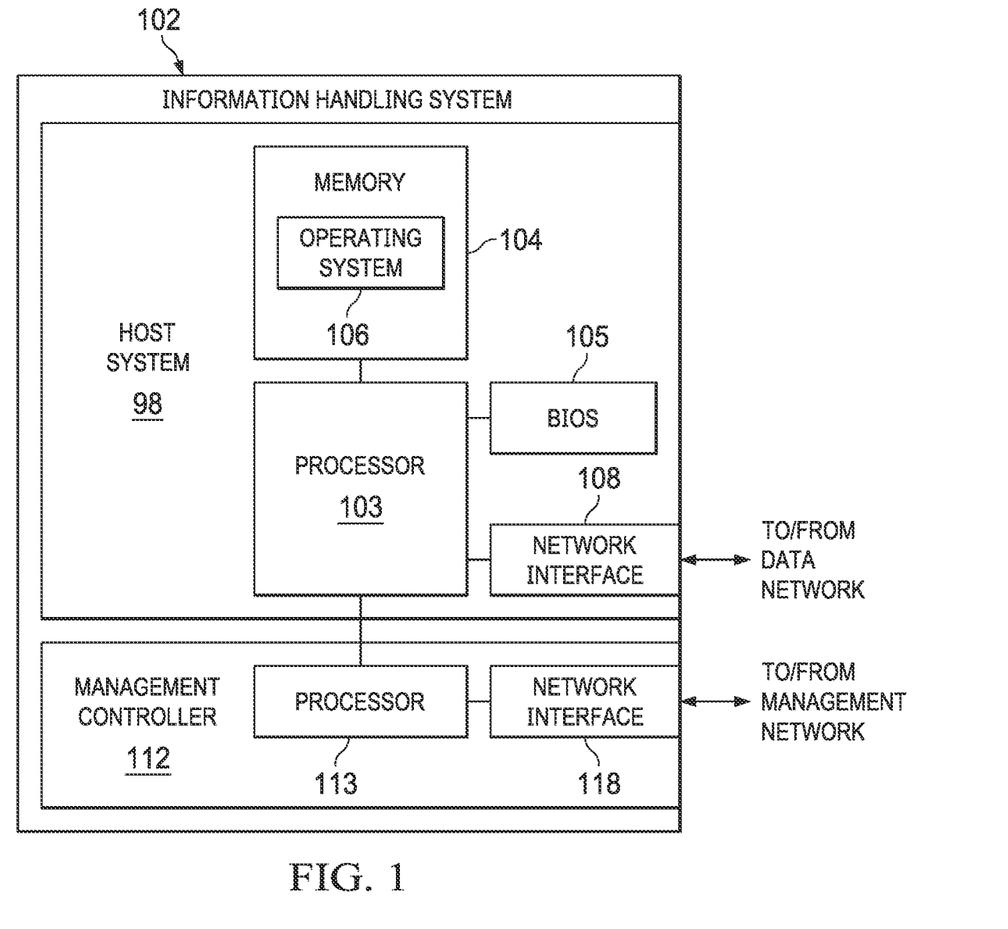
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

Figure 2:
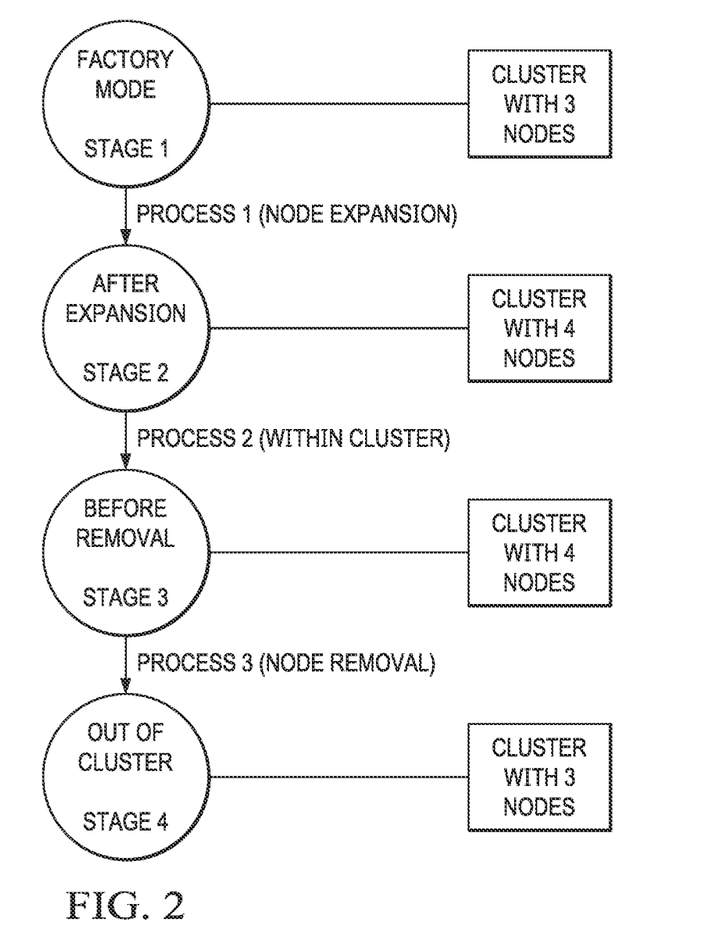
FIG. 2 illustrates an example method for expansion and contraction of a cluster of information handling systems, in accordance with embodiments of the present disclosure.

As discussed above, difficulties can arise when a procedure for adding an information handling system to a cluster fails. For context, FIG. 2 provides an example of such a procedure for adding a node to a cluster. At Stage 1, the cluster is in a factory configuration (e.g., the state in which it was delivered to a datacenter) and includes 3 nodes.

The cluster then undergoes a node expansion referred to as Process 1, and at Stage 2 it includes 4 nodes. Stage 2 and Stage 3 indicate normal use of the cluster in its expanded state prior to removal of a node. The transition from Stage 2 to Stage 3 is denoted Process 2, which includes the nodes operating normally within the cluster, and which may include various additional changes to the software and/or firmware of the node. As one of ordinary skill in the art with the benefit of this disclosure will appreciate, the software and firmware elements that need to be changed may include items from various manufacturers and/or vendors. For example, the firmware elements may be specific to various items of hardware within the node, etc.

The cluster then undergoes a node removal at Process 3, resulting in a cluster including 3 nodes at Stage 4.

In some embodiments, records may be made of the changes occurring to a given node at each stage, and these records may later be used to return the node to a particular state without having to re-image it. As is shown in FIG. 2, a given node may go through various stages, and its status may change during these processes. The life cycle of a node begins with Stage 1 and ends with Stage 4, and it would be desirable for the node to be in the same state subsequent to Stage 4 (e.g., so that it can later be added to another cluster directly without re-imaging or resetting to factory defaults manually).

The following discussion gives an example of various software and firmware changes that a node may undergo in one embodiment during its life cycle within a cluster.

Figure 3:
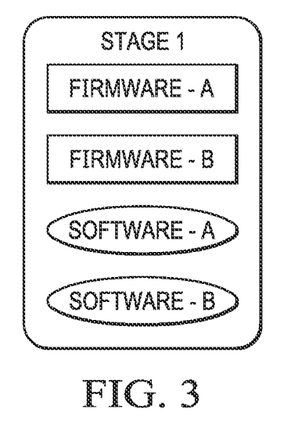
FIGS. 3-12 illustrate block diagrams of changes that may be made to components of an information handling system, in accordance with embodiments of the present disclosure.

FIG. 3 shows elements of a node of the cluster shown at Stage 1. The node includes two firmware elements and two software elements, each having a particular version. These are denoted Firmware-A, Firmware-B, Software-A, and Software-B.

Figure 4:
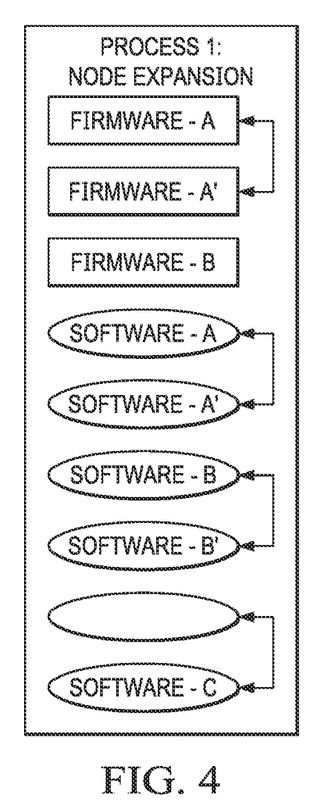

FIG. 4 illustrates changes that a new node may undergo when it is being prepared to be added to the cluster during Process 1 (Node Expansion). As shown, Firmware-A is upgraded to Firmware-A' (Firmware A Prime), Firmware-B is unchanged, Software-A is upgraded to Software-A', Software-B is upgraded to Software-B', and a new element Software-C is added. (Although each change is described as an upgrade in this embodiment, in other situations an element may be downgraded in order to integrate a node into a cluster.)

Figure 5:
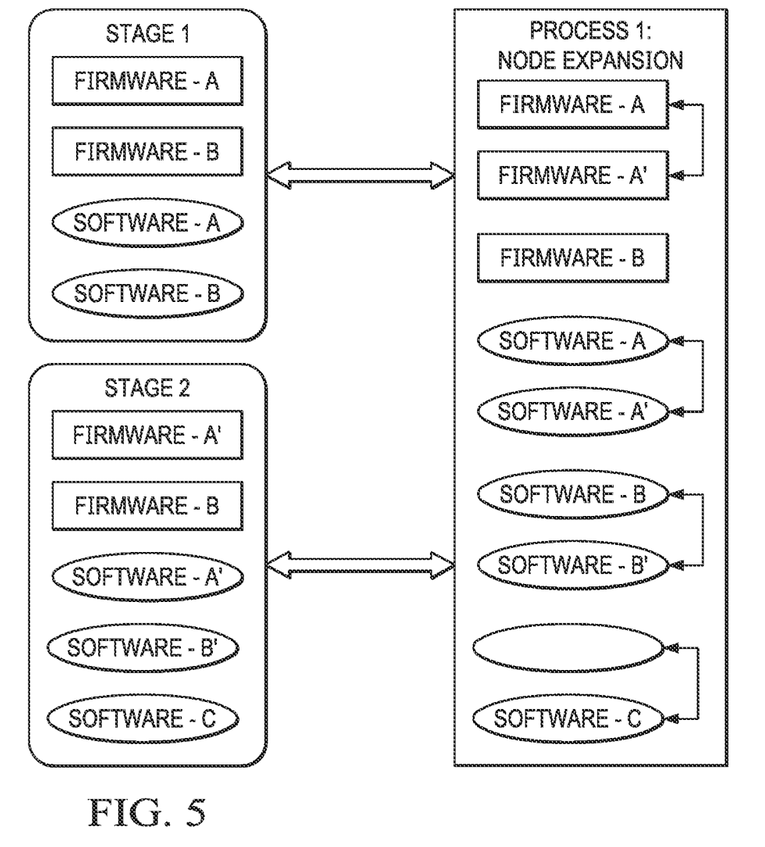

The upgrades shown in FIG. 4 may be reversible, as shown in FIG. 5. For example, if the upgrade process fails at some point, the software and firmware versions may all be rolled back to their prior state.

Figure 6:
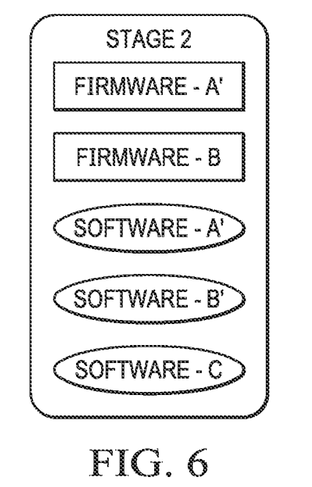

FIG. 6 shows the state of the node immediately after being added to the cluster (e.g., after completion of the upgrades illustrated in FIGS. 4 and 5).

Figure 7:
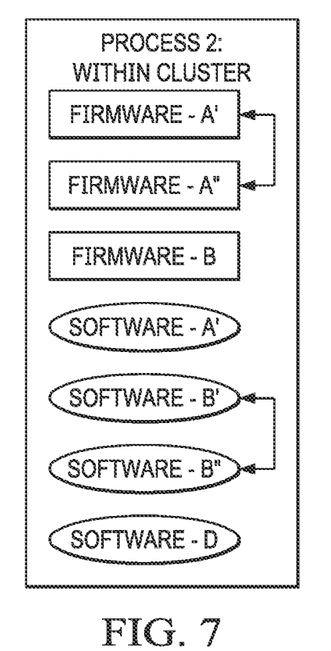

Once Process 1 (Node Expansion) has successfully completed, the node is in the cluster and under the management of the HCI management system. The initial status of the physical node may be recorded, and then as the cluster keeps undergoing additional upgrades and/or changes during use, the physical node is kept in the same state as the other nodes of the cluster. FIG. 7 illustrates additional changes to the firmware and software elements of the node that may occur during Process 2 (Within Cluster). In this example, Firmware-A' has been upgraded to Firmware-A", Firmware-B remains unchanged, Software-A' remains unchanged, Software-B' has been upgraded to Software-B", Software-C has been removed, and Software-D has been added.

Figure 8:
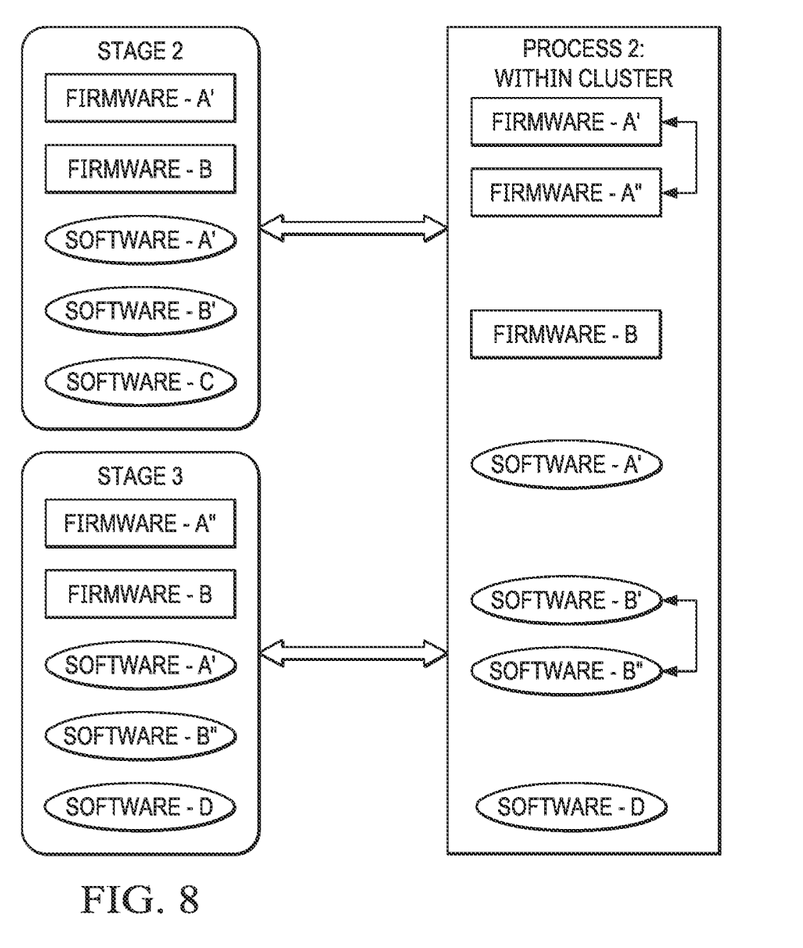

At each step, if the cluster remains in a good state, the changes are stored as a historical reference that can be reversed for when the physical node is removed from the cluster later. As noted above with respect to FIG. 5, the processes of FIG. 7 are also reversible via a rollback procedure. FIG. 8 illustrates.

Figure 9:
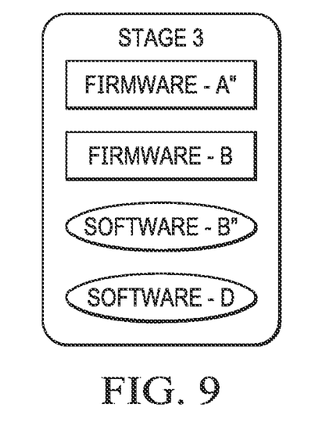

FIG. 9 shows the state of the node after completion of the of the in-cluster changes illustrated in FIGS. 7 and 8. If a physical node is scheduled to be removed from the cluster (e.g., to be repurposed for another cluster), the last known healthy state of the physical node may be immediately recorded before the removal procedure actually happens. Thus in case the removal procedure fails, this data can be used as a reference for restoration later on. In particular, the state illustrated in FIG. 9 is the state of the node immediately before its removal from the cluster during Process 3 (Node Removal).

Figure 10:
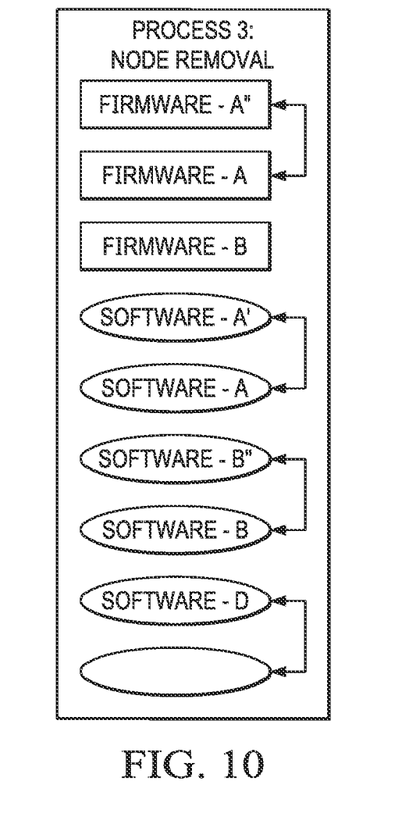

FIG. 10 illustrates the changes that the node undergoes for Process 3 (Node Removal). As shown, these changes are configured to return the node to its original state from FIG. 3. Firmware-A" is downgraded to Firmware A (e.g., downgraded directly or downgraded via an intermediate step of Firmware-A'), Firmware-B is unchanged, Software-A' is downgraded to Software-A, Software-B" is downgraded to Software-B (e.g., downgraded directly or downgraded via an intermediate step of Software-B'), and Software-D is removed.

Figure 11:
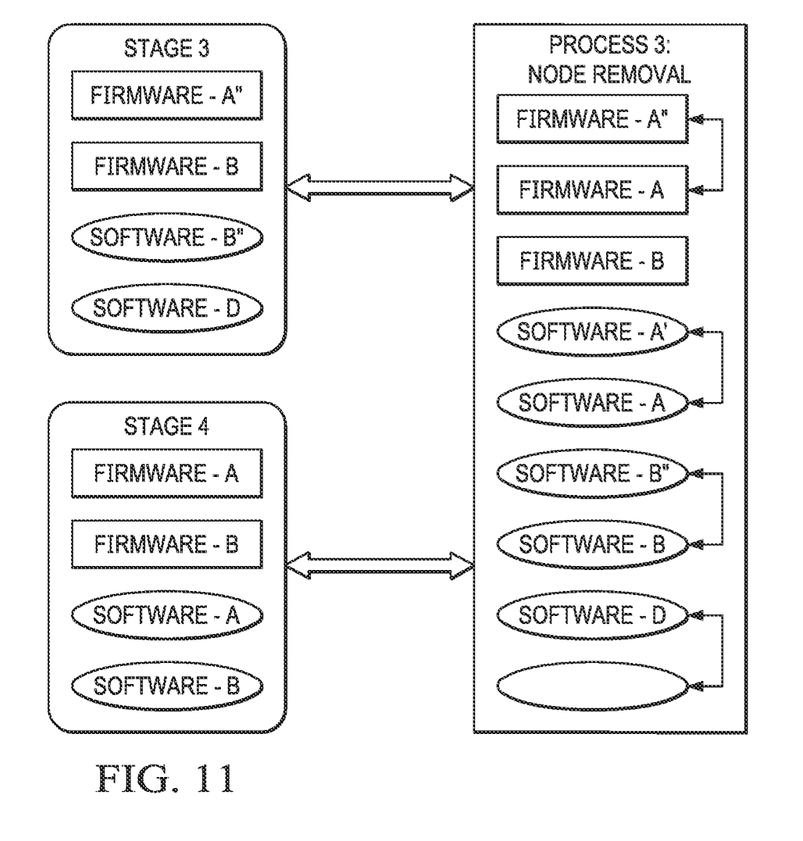

As noted above with respect to FIG. 5, this process is also reversible via a rollback procedure. FIG. 11 illustrates.

Figure 12:
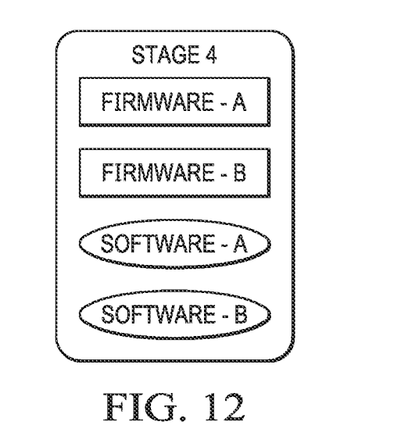

Finally, the node reaches the state shown in FIG. 12, which is identical to the state shown in FIG. 3. From this state, it may be added to another cluster without any manual intervention to re-image or reset the node to factory default settings.

Accordingly, embodiments of this disclosure may allow for successfully avoiding the additional efforts and time that would be required to reset a physical node after it is removed from a cluster, making the Node Expansion and Removal processes more convenient.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
at least one processor; and
a memory;
wherein the information handling system is configured to:
add a node having an initial factory configuration to a cluster of information handling systems;
subsequent to adding to the node to the cluster and while the node is a member of the cluster, cause a plurality of components of the node to be changed according to a first set of changes, wherein the first set of changes includes upgrading at least one firmware of the information handling system from a first version to a second version;
for each change in the first set of changes, store a record of the change; and
in response to an indication that the node is to be removed from the cluster, based on the records of the changes, cause the plurality of components of the node to be changed according to a second set of changes while the node is a member of the cluster, wherein the changes in the second set of changes are configured to undo the changes in the first set of changes to return the node to the initial factory configuration without performing a re-imaging of the node, wherein the second set of changes includes downgrading the at least one firmware from the second version back to the first version;
wherein the first set of changes includes a first particular change that removes a particular component from the node, and wherein the second set of changes includes a second particular change that reinstalls the particular component.

2. The information handling system of claim 1, wherein the cluster is a hyper-converged infrastructure (HCI) cluster.

3. The information handling system of claim 1, wherein the components include at least one software component and at least one firmware component.

4. The information handling system of claim 1, wherein the components include a plurality of firmware components that are specific to a corresponding plurality of physical information handling resources of the node.

5. The information handling system of claim 4, wherein the plurality of physical information handling resources have different manufacturers.

6. A computer-implemented method comprising:
adding a node having an initial factory configuration to a cluster of information handling systems;
subsequent to adding to the node to the cluster and while the node is a member of the cluster, causing a plurality of components of the node to be changed according to a first set of changes, wherein the first set of changes includes upgrading at least one firmware of the information handling system from a first version to a second version;

for each change in the first set of changes, storing a record of the change; and in response to an indication that the node is to be removed from the cluster, based on the records of the changes, causing the plurality of components of the node to be changed according to a second set of changes while the node is a member of the cluster, wherein the changes in the second set of changes are configured to undo the changes in the first set of changes to return the node to the initial factory configuration without performing a re-imaging of the node, wherein the second set of changes includes downgrading the at least one firmware from the second version back to the first version;

wherein the first set of changes includes a first particular change that removes a particular component from the node, and wherein the second set of changes includes a second particular change that reinstalls the particular component.

7. The method of claim 6, wherein the cluster is a hyper-converged infrastructure (HCI) cluster.

8. The method of claim 6, wherein the components include at least one software component and at least one firmware component.

9. The method of claim 6, wherein the components include a plurality of firmware components that are specific to a corresponding plurality of physical information handling resources of the node.

10. The method of claim 9, wherein the plurality of physical information handling resources have different manufacturers.

11. An article of manufacture comprising a non-transitory, computer-readable medium having computer-executable instructions thereon that are executable by a processor of an information handling system for:

adding a node having an initial factory configuration to a cluster of information handling systems;

subsequent to adding to the node to the cluster and while the node is a member of the cluster, causing a plurality of components of the node to be changed according to a first set of changes, wherein the first set of changes includes upgrading at least one firmware of the information handling system from a first version to a second version;

for each change in the first set of changes, storing a record of the change; and in response to an indication that the node is to be removed from the cluster, based on the records of the changes, causing the plurality of components of the node to be changed according to a second set of changes while the node is a member of the cluster, wherein the changes in the second set of changes are configured to undo the changes in the first set of changes to return the node to the initial factory configuration without performing a re-imaging of the node, wherein the second set of changes includes downgrading the at least one firmware from the second version back to the first version;

wherein the first set of changes includes a first particular change that removes a particular component from the node, and wherein the second set of changes includes a second particular change that reinstalls the particular component.

12. The article of claim 11, wherein the cluster is a hyper-converged infrastructure (HCI) cluster.

13. The article of claim 11, wherein the components include at least one software component and at least one firmware component.

14. The article of claim 11, wherein the components include a plurality of firmware components that are specific to a corresponding plurality of physical information handling resources of the node.

15. The article of claim 14, wherein the plurality of physical information handling resources have different manufacturers.

* * * * *